United States Patent
Hinds et al.

(10) Patent No.: US 7,489,826 B2
(45) Date of Patent: Feb. 10, 2009

(54) COMPENSATING FOR ERRORS IN PERFORMANCE SENSITIVE TRANSFORMATIONS

(75) Inventors: Arianne Therese Hinds, Boulder, CO (US); Joan LaVerne Mitchell, Longmont, CO (US)

(73) Assignee: Infoprint Solutions Company, LLC, Boulder, CO (US)

( * ) Notice: Subject to any disclaimer, the term of this patent is extended or adjusted under 35 U.S.C. 154(b) by 818 days.

(21) Appl. No.: 10/960,255

(22) Filed: Oct. 7, 2004

(65) Prior Publication Data

US 2006/0080373 A1    Apr. 13, 2006

(51) Int. Cl.
G06K 9/46    (2006.01)

(52) U.S. Cl. .................. 382/248; 382/276; 382/280; 382/281

(58) Field of Classification Search ................ 382/248, 382/276, 280, 281, 244; 345/422, 600; 708/490, 708/620; 375/240.17, 240.18, 240.2, E7.028, 375/241; 704/204, 216
See application file for complete search history.

(56) References Cited

U.S. PATENT DOCUMENTS

| | | | |
|---|---|---|---|
| 4,724,535 A * | 2/1988 | Ono | 375/241 |
| 5,408,598 A * | 4/1995 | Pryor, Jr. | 345/442 |
| 6,088,038 A * | 7/2000 | Edge et al. | 345/600 |
| 6,393,155 B1 * | 5/2002 | Bright et al. | 382/248 |
| 7,194,138 B1 * | 3/2007 | Bright et al. | 382/248 |
| 7,218,789 B2 * | 5/2007 | Faber et al. | 382/244 |

OTHER PUBLICATIONS

Perkins, "A Separable Hartley-Like Transform in Two or More Dimensions", IEEE, vol. 75, No. 8, Aug. 1987, pp. 1127-1129.*

* cited by examiner

*Primary Examiner*—Anh Hong Do
(74) *Attorney, Agent, or Firm*—Duft Bornsen & Fishman, LLP (57) ABSTRACT

The invention provides a method, a data analyzing system, an apparatus, and article of manufacture which reduce the error in transform equations in which constants are replaced by approximations. This is achieved by factoring an adjustment factor into the calculations which serves to reduce the error introduced by the approximations. For a forward transform equation this may be performed as part of a quantization step and for an inverse transform equation this may be performed as part of a de-quantization step. For example the adjustment factor could reduce the maximum error associated the approximations.

26 Claims, 5 Drawing Sheets

Fig. 5

COMPENSATING FOR ERRORS IN PERFORMANCE SENSITIVE TRANSFORMATIONS

CROSS REFERENCE TO RELATED APPLICATIONS

This application is related to the following co-pending and commonly-assigned patent applications, which are hereby incorporated herein by reference in their respective entirety: "Reducing errors in performance sensitive transformations" to Hinds et al., patent application Ser. No. 10/960,253. "Improving approximations used in performance sensitive transformations which contain sub-transforms" to Mitchell et al., patent application Ser. No. 11/041,563.

BACKGROUND OF THE INVENTION

1. Field of the Invention

This invention relates in general to data processing, and more particularly to compensating for errors in performance sensitive transformations 2. Description of the Related Art Transforms, which take data from one domain (e.g., sampled data) to another (e.g., frequency space), are used in many signal and/or image processing applications. Such transforms are used for a variety of applications, including, but not limited to data analysis, feature identification and/or extraction, signal correlation, data compression, or data embedding. Many of these transforms require efficient implementation for real-time and/or fast execution whether or not compression is used as part of the data processing.

Data compression is desirable in many data handling processes, where too much data is present for practical applications using the data. Commonly, compression is used in communication links, to reduce transmission time or required bandwidth. Similarly, compression is preferred in image storage systems, including digital printers and copiers, where "pages" of a document to be printed may be stored temporarily in memory. Here the amount of media space on which the image data is stored can be substantially reduced with compression. Generally speaking, scanned images, i.e., electronic representations of hard copy documents, are often large, and thus make desirable candidates for compression.

In data processing, data is typically represented as a sampled discrete function. The discrete representation is either made deterministically or statistically. In a deterministic representation, the point properties of the data are considered, whereas, in a statistical representation, the average properties of the data are specified. In particular examples referred to herein, the terms images and image processing will be used. However, those skilled in the art will recognize that the present invention is not meant to be limited to processing still images but is applicable to processing different data, such as audio data, scientific data, sensor data, video data, etc.

In a digital image processing system, digital image signals are formed by first dividing a two-dimensional image into a grid. Each picture element, or pixel, in the grid has associated therewith a number of visual characteristics, such as brightness and color. These characteristics are converted into numeric form. The digital image signal is then formed by assembling the numbers associated with each pixel in the image into a sequence which can be interpreted by a receiver of the digital image signal.

Signal and image processing frequently require converting the input data into transform coefficients for the purposes of analysis. Often only a quantized version of the coefficients is needed (e.g. JPEG/MPEG data compression or audio/voice compression). Many such applications need to be done fast in real time such as the generation of JPEG data for high speed printers.

Pressure is on the data signal processing industry to find the fastest method by which to most effectively and quickly perform the digital signal processing. As in the field of compression generally, research is highly active and competitive in the field of fast transform implementation. Researchers have made a wide variety of attempts to exploit the strengths of the hardware intended to implement the transforms by exploiting properties found in the transform and inverse transform.

One such technique is the ISO 10918-1 JPEG International Standard/ITU-T Recommendation T.81. The draft JPEG standard is reproduced in Pennebaker and Mitchell, "JPEG Still Image Data Compression Standard", New York, Van Nostrand Reinhold, 1993, incorporated herein by reference. One image analysis method defined in the JPEG standard, as well as other emerging compression standards, is discrete cosine transform (DCT) coding. With DCT coding, images are decomposed using a forward DCT (FDCT) and reconstructed using an inverse DCT (IDCT). An excellent general reference on DCTs is Rao and Yip, "Discrete Cosine Transform: Algorithms Advantages and Applications", New York, Academic Press, 1990, incorporated herein by reference. It will be assumed that those of ordinary skill in this art are familiar with the contents of the above-referenced books.

It is readily apparent that if still images present storage problems for computer users and others, motion picture storage problems are far more severe, because full-motion video may require up to 60 images for each second of displayed motion pictures. Therefore, motion picture compression techniques have been the subject of yet further development and standardization activity. Two important standards are ISO 11172 MPEG International Standard and ITU-T Recommendation H.261. Both of these standards rely in part on DCT coding and IDCT decoding.

DCT is an example of a linear transform algorithm, and in such transforms it is common for floating point constants to be used in multiplication operations. However floating point multiplication operations are expensive in terms of processor computations, and consequently slow down the speed at which the transform executes. As a result in applications in which the speed of processing is important, such as in JPEG/MPEG compression, designers seek to replace these floating point multiplications with integer multiplication operations which are faster to execute. Current designs demonstrate three general approaches by which this is achieved:

"Development of Integer Cosine Transforms by the Principle of Dyadic Symmetry", Cham, W.-K, IEE Proceedings, Vol. 136, Pt. 1, No 4, August 1989 describes replacing the floating point multiplications with multiplications done in fixed precision, i.e. approximate the floating point constant with an integer.

"Multiplierless Approximation of Transforms with Adder Constraint", Chen, Ying-Jui, Soontorn Oraintara, Trac D. Tran, Kevin Amaratunga, Truong Q. Nguyen, IEEE Signal Processing Letters, Vol. 9, No. 11, November 2002, describes approximating the floating point constant multiplication or integer multiplication with a series of shift and add operations. In this approach, the goal is to implement the multiplication operation in terms of shift and add operations on the multiplicand.

U.S. Pat. No. 6,766,341—Fast transform using scaled terms, to IBM Corp. describes approximating the floating point constant by finding a ratio (i.e. an integer numerator and an integer denominator) in which the numerator represents the bit patterns to be used in shift/add operations (as in "Multiplierless Approximation of Transforms with Adder Constraint" above), and the denominator scales the final result to achieve the accuracy of the approximation. Note that in this case, the shifts and adds are done during the processing of the inputs to the transform, and the denominator (divide operation or multiplication by the inverse) is folded into the quantization step.

However, the problem posed by replacing floating point operations with fast approximations is actually a multi-criteria optimization problem. Criterion one is to find an approximation that is quick to execute. This criterion refers to the "cost" of an approximation in terms of shifts and adds. The greater the number of shift and add operations, then the greater the total cost to execute all of the operations. Criterion two (equal in import to criterion one) is to mitigate any error, in the final transform output, which result from the approximations. As demonstrated in the prior art, scientists and engineers use different approaches to finding good approximations, but in general, their approaches all use heuristics and sometimes, guesses, at what truly constitutes a good balance between speed and accuracy, and the result is algorithms in which accuracy is sacrificed in the pursuit of optimal cost.

Accordingly what is needed is an algorithm for compensating for the errors which are introduced by the approximations used to increase the speed of transformation algorithms, but in a manner which does not significantly affect performance.

SUMMARY OF THE INVENTION

To overcome the limitations in the prior art described above, and to overcome other limitations that will become apparent upon reading and understanding the present specification, the present invention discloses compensating for errors which are introduced into performance sensitive transforms as a result of approximations.

Accordingly, according to a first aspect the present invention provides a method comprising: obtaining the result of a forward transform equation wherein the result includes an error which was introduced as a result of approximations used when calculating the result; and modifying the result using an adjustment factor which reduces the error.

According to a second aspect the present invention provides a data analyzing system comprising: a transformer for producing a result of a forward transform equation wherein the result includes an error which was introduced as a result of approximations used when calculating the result; and a quantizer for modifying the result using an adjustment factor which reduces the error.

According to a third aspect the present invention provides an article of manufacture comprising a program storage medium readable by a computer, the medium tangibly embodying one or more programs of instructions executable by a computer to perform a method for performing a transform equation, the method comprising: obtaining the result of a forward transform equation wherein the result includes an error which was introduced as a result of approximations used when calculating the result; and modifying the result using an adjustment factor which reduces the error.

Preferably the result is modified with the adjustment factor in a quantization step because this avoids the need for a separate calculation specifically for the adjustment factor.

Preferably when the result is modified using the adjustment factor this is done in fixed precision.

Optionally the adjustment factor is included as part of a scaling factor which is used to scale the result. For example the scaling factor may also include a denominator of the approximation which was used when performing the transform equation.

Optionally the adjustment factor further reduces error which will result from processing the results of the forward transform equation with an inverse transform equation. In such a case the result may be alternatively modified as part of a de-quantization step.

Preferably the adjustment factor reduces the maximum error associated with the transform equation. Alternatively, for example, the adjustment factor could be for reducing average error in the transformation or for reducing error for a specific set of data.

According to a fourth aspect the present invention provides a method comprising: modifying input data using an adjustment factor; performing an inverse transform equation on the input data; wherein the adjustment factor reduces error which is introduced as a result of approximations used when performing the inverse transform.

According to a fifth aspect the present invention provides a data analyzing system comprising: a de-quantizer for modifying input data using an adjustment factor; and a transformer for performing an inverse transform equation on the input data, wherein the adjustment factor reduces error which is introduced as a result of approximations used when performing the inverse transform.

According to a sixth aspect the present invention provides an apparatus comprising: memory for storing image data; a processor for processing the image data to provide a compressed print stream output; and a printhead driving circuit for controlling a printhead to generate a printout of the image data; wherein the processor processes the image data by: modifying input data using an adjustment factor; performing an inverse transform equation on the input data; wherein the adjustment factor reduces error which is introduced as a result of approximations used when performing the inverse transform.

According to a seventh aspect the present invention provides an article of manufacture comprising a program storage medium readable by a computer, the medium tangibly embodying one or more programs of instructions executable by a computer to perform a method for performing a transform equation, the method comprising: modifying input data using an adjustment factor; performing an inverse transform equation on the input data; wherein the adjustment factor reduces error which is introduced as a result of approximations used when performing the inverse transform.

Preferably modifying the input data is performed as part of a de-quantization step.

Optionally the adjustment factor is included as part of a scaling factor which is used to scale the input data. For example the scaling factor may also include a denominator of the an approximation to be used when performing the inverse transform equation.

Optionally the adjustment factor further reduces error which resulted from creation of the input data using a forward transform equation. For example, this may be done if the error was not adjusted when the input data was created.

Optionally the adjustment factor reduces the maximum error associated with the transform equation. Alternatively, for example, the adjustment factor could be for reducing average error in the transformation or for reducing error for a specific set of data.

BRIEF DESCRIPTION OF THE DRAWINGS

Some of the purposes of the invention having been stated, others will appear as the description proceeds, when taken in connection with the accompanying drawings, in which.

DETAILED DESCRIPTION OF THE ILLUSTRATIVE EMBODIMENTS

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
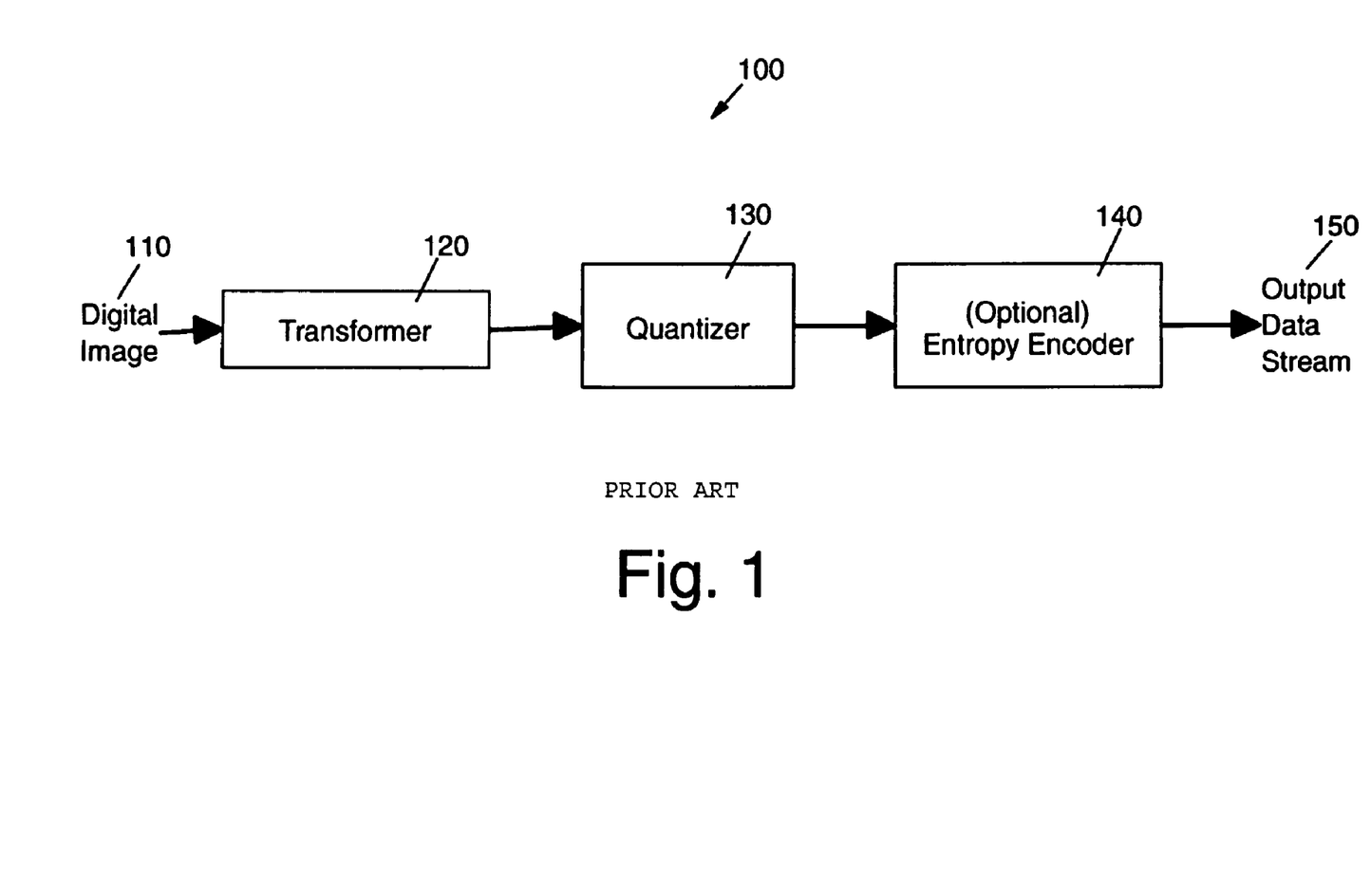
FIG. 1 is prior art image compression system 100 in which the present invention could be advantageously applied.

FIG. 1 illustrates a prior art image compression system 100 in which the present invention could be advantageously applied. The image compression system may include three closely connected components namely (a) Transformer 120, (b) Quantizer 130, and (c) Optional Entropy Encoder 140. Compression is accomplished by applying a linear transform to de-correlate the image data 110, quantizing the resulting transform coefficients, and, if desired, entropy coding the quantized values. A variety of linear transforms have been developed which include Discrete Fourier Transform (DFT), Discrete Cosine Transform (DCT), Discrete Wavelet Transform (DWT) and many more, each with its own advantages and disadvantages.

The quantizer 130 simply reduces the number of bits needed to store the transformed coefficients by reducing the precision of those values. Since this is a many-to-one mapping, it is a lossy process and is a significant source of compression in an encoder. Quantization can be performed on each individual coefficient, which is known as Scalar Quantization (SQ). Quantization can also be performed on a collection of coefficients together, and this is known as Vector Quantization (VQ). Both uniform and non-uniform quantizers can be used depending on the problem at hand.

The optional entropy encoder 140 further compresses the quantized values losslessly to give better overall compression. It uses a model to accurately determine the probabilities for each quantized value and produces an appropriate code based on these probabilities so that the resultant output code stream will be smaller than the input stream. The most commonly used entropy encoders are the Huffman encoder and the arithmetic encoder, although for applications requiring fast execution, simple run-length encoding (RLE) has proven very effective.

The term image transforms usually refers to a class of unitary matrices used for representing images. This means that images can be converted to an alternate representation using these matrices. These transforms form the basis of transform coding. Transform coding is a process in which the coefficients from a transform are coded for transmission.

Consider the signal f(x) which is a function mapping each integer from 0 ... n-1 into a complex number. An example is given by a line of a sampled or pixelated image, where the samples or pixels are equally spaced. An "orthogonal basis" for a collection of such f(x) is a set $\{b_y(x)\}_{y=0}^{n-1}$ of functions, where $$\sum_{x=0}^{n-1} b_y(x) b_z(x) = 0 \text{ for } y \neq z.$$

A "transform" of f (x), denoted F(y), is given by $$F(y) = \sum_{x=0}^{n-1} f(x) b_y(x).$$

Transforms of this type are used in many signal and image processing applications to extract information from the original signal f. One example of a transform is the discrete Fourier transform (DFT), where $b_y(x) = \exp(2\pi i x y/n)$. A related example is the discrete cosine transform (DCT), where $b_y(x) = \cos(2\pi x y/n)$ Another example is the wavelet transform, where $b_y(x)$ is a particular scaled and offset version of the mother wavelet function. (See, Ingrid Daubechies, *Ten Lectures on Wavelets*, Society for Industrial & Applied Mathematics, (May 1992)).

The theoretical basis for the independent scaling operations will now be demonstrated by showing the mathematical basis for being able to perform the scales without destroying the structure of the transform. Define a transform $$F(y) = \sum_{x=0}^{n-1} f(x) b_y(x).$$

Consider those cases (described below) when the $b_y(x)$ are such that this transform can be split into two or more disjoint sums, regardless of the structure of f(x). (The term "disjoint", when used herein in reference to the sets of equations, means that there are no transform coefficients in common between equations in the two disjoint sets of equations.) For example, if $b_{2y}(x)$ have even symmetry, and $b_{2y+1}(x)$ have odd symmetry, it is known from mathematics that any f(x) can be written uniquely as $f(x) = f_e(x) + f_o(x)$, where $f_e(x)$ is even (symmetric about zero) and $f_o(x)$ is odd (non symmetric about zero), and that $$\sum_x f_e(x) b_{2y-1}(x) = \sum_x f_o b_{2y}(x) = 0.$$

This enables the transform to be written equivalently as:

$$F(y) = \sum_{y=0}^{\lfloor(n-1)/2\rfloor} f_e(x)b_{2y}(x) + \sum_{y=1}^{\lfloor n/2 \rfloor} f_o(x)b_{2y-1}(x)$$

An example of such a transform is a 1-D DCT which is used, for example, to decompose a set of 8 greyscale samples to their underlying spatial frequencies. Further a 1-D DCT can be extended to apply to 2-D Images which require and 8×8 array of samples. 2-D images are processed by multiplying a horizontally oriented set of 1-D DCT functions by a vertically oriented set of the same functions, such an arrangement being a 2-D DCT. However for the purposes of describing the preferred embodiment of the present invention a 1-D DCT will be used, and a skilled person will realize that this can be considered equivalent to processing the top row of an 8×8 2-D image sample, such as for a JPEG image.

In a 1-D DCT the set of eight samples are represented by 8 values s(x) for x=0 to 7, and each is transformed using a Forward DCT (FDCT) which comprises the following equations:

$$S(u) = (C(u)/2) \sum_{x=0}^{7} s(x) \cos[(2x+1)u\pi/16]$$

The transformed image is then reconstructed using an Inverse DCT (IDCT) which comprises the following equations:

$$s(x) = \sum_{u=0}^{7} (C(u)/2)S(u) \cos[(2x+1)u\pi/16]$$

In which:

u=0 to 7

$C(u)=1/\sqrt{2}$ for u=0

C(u)=1 for u>0 s(x)=value from JPEG sample

S(u)=DCT coefficient for JPEG sample values

However, if these equations were followed in full, the cost in terms of execution would be high because the mathematical executions are complex and many. As a result the equations are reduced to a more simple set, such a set being known as Fast DCT. One well known FAST DCT for the above 1-D FDCT results in the following equations:

$2 S(0) = C_4(s_{0734} + s_{1625})$ $2 S(1) = C_1 d_{07} + C_3 d_{16} + C_5 d_{25} + C_7 d_{34}$ $2 S(2) = C_2 d_{0734} + C_6 d_{1625}$ $2 S(3) = C_3 d_{07} - C_7 d_{16} - C_1 d_{25} - C_5 d_{34}$ $2 S(4) = C_4(s_{0734} - s_{1625})$ $2 S(5) = C_5 d_{07} - C_1 d_{16} + C_7 d_{25} + C_3 d_{34}$ $2 S(6) = C_6 d_{0734} - C_2 d_{1625}$ $2 S(7) = C_7 d_{07} - C_5 d_{16} + C_3 d_{25} - C_1 d_{34}$

In which:

$C_n = \cos(n\pi/16)$ $s_{jk} = s(j) + s(k)$ $s_{jklm} = s(j) + s(k) + s(l) + s(m)$ $d_{jk} = s(j) - s(k)$ $d_{jklm} = s(j) + s(k) - s(l) - s(m)$ If this FAST FDCT were used in executing the transform it would require 22 multiplications and 28 additions. However the constants $C_n$ are floating point values and therefore result in expensive floating point multiplications. Accordingly, in the prior art, these values are replaced with approximations.

For example in U.S. Pat. No. 6,766,341, the constants are replaced with integer approximations, and in co-pending patent application 10/960,253 the constants are replaced with integer numerators and floating point denominators. However in both cases the approximation results in errors being introduced into the calculations.

Consider the following equation from the above FAST DCT:

$2 S(1) = C_1 d_{07} + C_3 d_{16} + C_5 d_{25} + C_7 d_{34}$

An approximation to a value is the value plus the error introduced by the approximation. And if $E_n$ denotes the error introduced by the approximation of $C_n$ the equation may be re-written:

$$2S_e(1) = (C_1 + E_1)d_{07} + (C_3 + E_3)d_{16} +$$
$$(C_5 + E_5)d_{25} + (C_7 d + E_7)d_{34}$$
$$= (C_1 d_{07} + C_3 d_{16} + C_5 d_{25} + C_7 d_{34}) +$$
$$(E_1 d_{07} + E_3 d_{16} + E_5 d_{25} + E_7 d_{34})$$

Where $S_e(1)$ is the value of S(1) which includes the error introduced by the approximations, and $(E_1 d_{07} + E_3 d_{16} + E_5 d_{25} + E_7 d_{34})$ is the error introduced into the calculation as a result of the approximations.

Further a skilled person will realize that a similar equation for error can be written for each of the S(n) calculations in the FAST DCT shown above and this may then be expressed in general terms as:

$2S_e(n) = 2(S(n) + E(n))$ for n=0 to 7 where:

E(n) represents the error introduced into the calculation as a result of the approximations.

According to the preferred embodiment of the present invention it is possible to compute for a given FDCT and a defined set of data: the values for S(n) that would result if no approximations were used (i.e.: E(n) is 0); and the values of $S_e(n)$ that would result if a defined set of approximations were used. From this it is possible to measure the value of E(n) for the defined data, when the defined approximations are used, by comparing the S(n) values computed. For example the defined data could include the values that would serve to produce the maximum error and minimum errors introduced by the approximations. Or alternatively the defined data could include values defined to produce the average error introduced by the approximations.

Once the errors have been measured, given that values for $S(n)$ and $S_e(n)$ are known, it is now possible to estimate $S_e(n)$ in terms of $S(n)$ for a given type of error. For example it may be discovered that the maximum error introduced by a given set of approximations for a given transform gives the result:

$$S(1) \cong 1.01 * S_e(1)$$

$$S(1) \cong 1.01 * S_e(1)$$

Etc . . .

This can be expressed in a more general way as:

$$S(n) \cong \text{adjust}(n) * S_e(1)$$

For n=0 to 7

Where adjust(n) quantifies the measured error introduced by the approximation used.

Returning to the equation:

$$2\,S(1) = C_1 d_{07} + C_3 d_{16} + C_5 d_{25} + C_7 d_{34}$$

If the constants $C_n$ are replaced by approximations comprising integer numerators ($N_n$) for each constant and a common denominator $D(1)$, this equation can be re-written:

$$D(1) * 2 S_e(1) = N_1 d_{07} + N_3 d_{16} + N_5 d_{25} + N_7 d_{34};$$

and more generally as:

$$D(n) * \text{scale}(n) * S_e(n) = X(n)$$

For n=0 to 7

Where:

Scale(n) is the scale which compensates for the left side of the calculation resulting in some multiple of S(n). For example in the DCT under consideration this value is 2 for all equations, but in other DCTs this value may be different.

X(n) is the evaluation of the right side of transform equation with the constants replaced by appropriate integer numerators.

From this it can be seen that the error introduced by the approximations can be reduced by replacing $S_e(n)$ with adjust (n)*S(n) and this results in the equation:

$$D(n) * \text{scaler}(n) * \text{adjust}(n) * S(n) = X(n)$$

Or $$S(n) = X(n) / (D(n) * \text{scaler}(n) * \text{adjust}(n))$$

Accordingly, according to the preferred embodiment of the present invention adjust(n) values are computed for the one or more sets of approximations which may be used at run-time when performing the FAST DCT equations at run time. The adjust(n) values are then used at runtime to modify the results of the transform equations in order to compensate for the errors introduced by the approximations used, and this is performed in the quantization step. As a result the quantization step may be written:

$$S(n)/Q = X(n) * sf(n)/Q(n)$$

Where:

Sf(n) is the scale factor and equals $1/(D(n) * \text{scaler}(n) * \text{adjust}(n))$.

Q(n) is the quantization constant.

However, in this calculation adjust(n) is a floating point number and D(n) may also be a floating point number and it is desirable to avoid floating point multiplications at runtime for performance reasons. Accordingly, in the preferred embodiment of the present invention, use is made of the time of availability of the various values where time of availability is considered in terms of design time, initialization time and run time. Design time is the time when, for example, the software to perform the transform calculations is written, initialization time is when, for example, a JPEG image is received and initial calculations are made in preparation for performing transformation or reconstruction of the image, and run time is the time when the transformation or reconstruction is performed.

In the equation above, for example: the values scale(n), D(n) and adjust(n) are known at design time because these are a function of the DCT which is used by the software to transform the data, and the approximations used when calculating the equations; the values of the Q(n) constant are known at initialization time because they apply, for example, to an entire image; and the value of X(1) is known at run time because this represents the image data. Accordingly, some components of the calculation can be made in advance of run time in order to reduce both the complexity of the calculation at run time and the error that might be introduced by using approximations for floating point values known ahead of run time.

Accordingly sf(n) values for each set of approximations are known at design time which is when the constant approximations are fixed for the DCT. As a result, in the preferred embodiment of the present invention, these values are calculated to full precision at design time without incurring a performance overhead at run time.

Further the Q(n) are known at initialization time. As a result sf(n)/Q(n) can be calculated at initialization time and need only be calculated a maximum of 8 times for a given data set (it may be less than 7 because some sf(n) and Q(n) values may be the same). Accordingly, in the preferred embodiment of the present invention this calculation is also performed in full precision and incurs a negligible performance overhead for a JPEG image when it is considered that a typical image will comprise well in excess of 10,000 pixels (i.e.: 10,000 X(n) for n=0 to 7).

As a result of performing these calculations before run time, the calculation that remains to be performed at runtime for each pixel is;

$$S(n)/Q(n) = q(n) * X(n)$$

Where:

n=0 to 7

$$q(n) = sf(n)/Q(n)$$

However, this calculation involves floating point values q(n) and as a result, in the preferred embodiment of the present invention, these are converted to fixed precision for the purposes of the calculation. This requires a shift left by "n" bits and rounding (or truncation) of the remainder after the decimal point, before the calculation is performed, and a shift right by "n" bits of the result. Note that a shift left can also be described as a multiply by 2 to the power "n", and a shift right as a divide by 2 to the power "n", and further this may also be described as selecting a precision of "n". In such a calculation error is introduced by the rounding (or truncation) after the shift left and as a result, in general, the greater value of "n" the smaller the error introduced. This can be illustrated by example.

For example, if it is required to multiply by a value by 0.7071 the following table shows, for various precisions (values of n): the shifted left value, the rounded shifted left value which is used in a calculation; the right shifted rounded value (which is the effective number used in place of 0.7071 in the calculation); and the effective error which is the difference between 0.7071 and the right shifted rounded value used in the calculation:

| n | value << n | rounded value | rounded value >> n | effective error |
|---|---|---|---|---|
| 0 | 0.7071 | 1 | 1 | −0.2929 |
| 1 | 1.4142 | 1 | 0.5000 | +0.2071 |
| 2 | 2.8284 | 3 | 0.7500 | +0.0429 |
| 3 | 5.6568 | 6 | 0.7500 | +0.0429 |
| 4 | 11.3136 | 11 | 0.6875 | −0.0196 |
| 5 | 22.6272 | 23 | 0.78175 | +0.0116 |
| 6 | 45.2544 | 45 | 0.703125 | −0.003975 |
| 7 | 90.5088 | 91 | 0.7109375 | +0.0038375 |
| 8 | 181.0176 | 181 | 0.70703125 | +0.00006875 |
| 9 | 362.0352 | 362 | 0.70703125 | +0.00006875 |
| 10 | 724.0704 | 724 | 0.70710000 | 0.0 |

From this table it can be seen that, in general, as precision is increased the effective error decreases but the greater the number of bits required to load the rounded value into memory and therefore the greater the number of bits required to perform the calculation with the rounded value. As a result it can be seen that there is a trade-off between the amount of error which may be introduced and the number of bits required to perform the calculation. Also, note that that in this example the error reduces to 0 for precision 10 because the example used a number to only four decimal places. However, in general when considering number to more decimal places the precision at which error will become 0 will be higher.

However, the inventors have further observed that increased precision does not, in all cases, result in less error. For example, when looking at the value 0.7071 it can be seen from the table above that an increase from precision 2 to precision 3, and from precision 8 to precision 9, does not result in less effective error. This is because, for example, the binary representation of the rounded value for precision 2 is "11" and the rounded value for precision 3 is "110". As a result the first shift of the precision 3 value simply loses a "0" value which is nothing. From this it can be seen that for each trailing "0" in the binary representation of a rounded value, a single drop of precision is possible without increasing the effective error. Therefore, if the binary representation of the rounded value has n trailing "0"s it is possible to drop n levels of precision without increasing the effective error.

Accordingly in the preferred embodiment of the present invention the precision selected for q(n) when converting to fixed precision is the minimum precision available for the acceptable level of error. In other words the value to be converted to fixed precision for the purposes of calculation is multiplied by a power of 2 which is determined to be the smallest power of 2 which results in a predetermined acceptable error.

Figure 2:
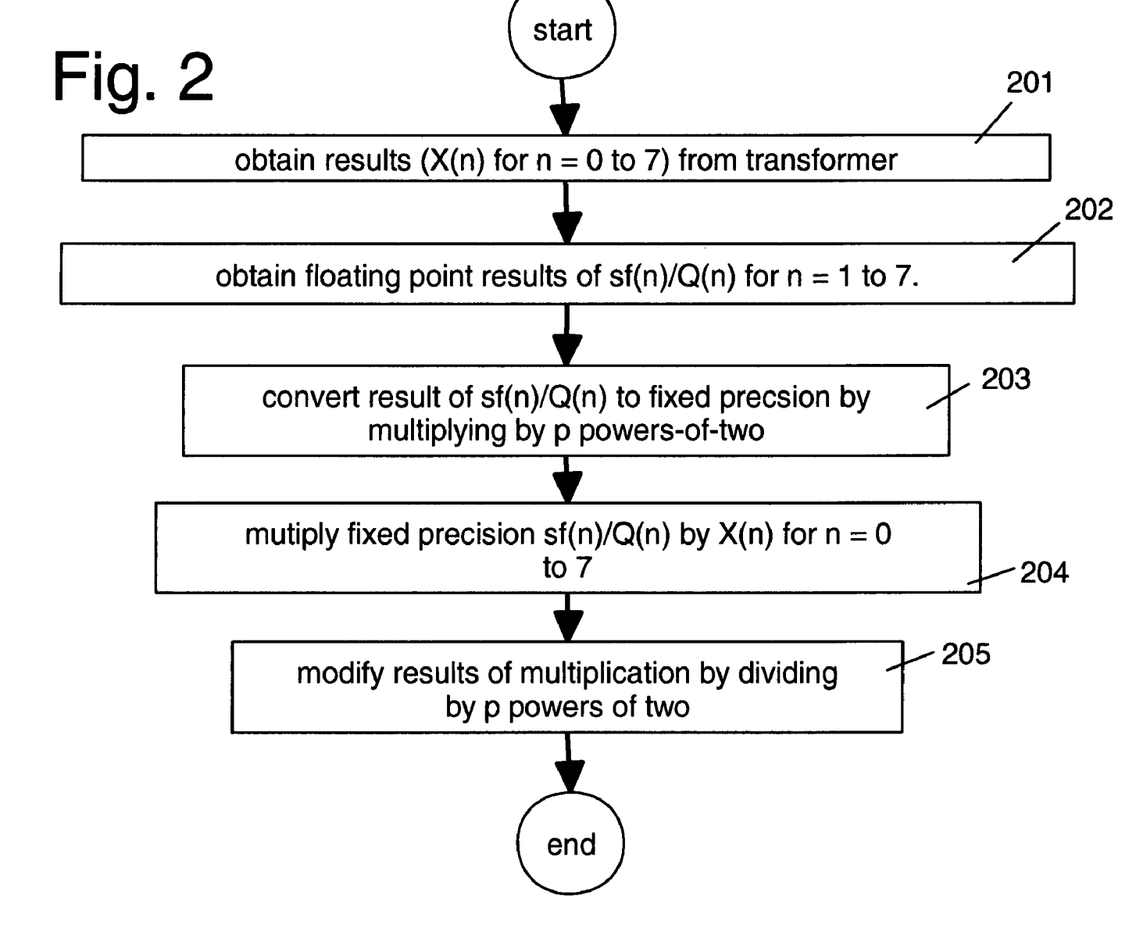
FIG. 2 is a flow chart of quantizing a transformed JPEG image according to the preferred embodiment of the present invention.

Accordingly FIG. 2 is a flow chart of a quantization step for an FDCT according to the preferred embodiment of the present invention. At step 201 the results of an FDCT transformation of a data sample are obtained and these comprise X(n) for n=0 to 7 and comprise the result of the transformation which was performed with the constants replaced by the integers numerator of their approximations. At step 202 the results of the calculation of sf(n)/Q(n) are obtained where sf(n) includes adjustment values which compensate for the error introduced by the approximations used in place of the constants for calculating the transformations. At step 203 the sf(n)/Q(n) values are converted to fixed precision and this is done by shifting the binary representations of the values p bits to the left and rounding after the decimal point to leave an integer. Then, at step 204, the multiplications of X(n) and sf(n)/Q(n), for n=0 to 7 are performed using the fixed precision sf(n)/Q(n). Finally at step 205 the binary representations of the results of the multiplication are shifted by p bits to the right to effectively undo the left shifts at step 203. This leaves the values which comprise the quantized version of the transformed image.

Note that whilst the present invention has been described in terms of error introduced by an FDCT, a skilled person would realize that it is also possible to compute and compensate for errors in an IDCT. As such a single adjustment value can be computed and used to compensate for error introduced by both the FDCT and IDCT in combination. Alternatively separate adjustments can be calculated for FDCT and IDCT. Further, whichever is calculated an adjustment may be made in the de-quantization step of an IDCT in addition to, or instead of, the quantization step of an FDCT.

Figure 3:
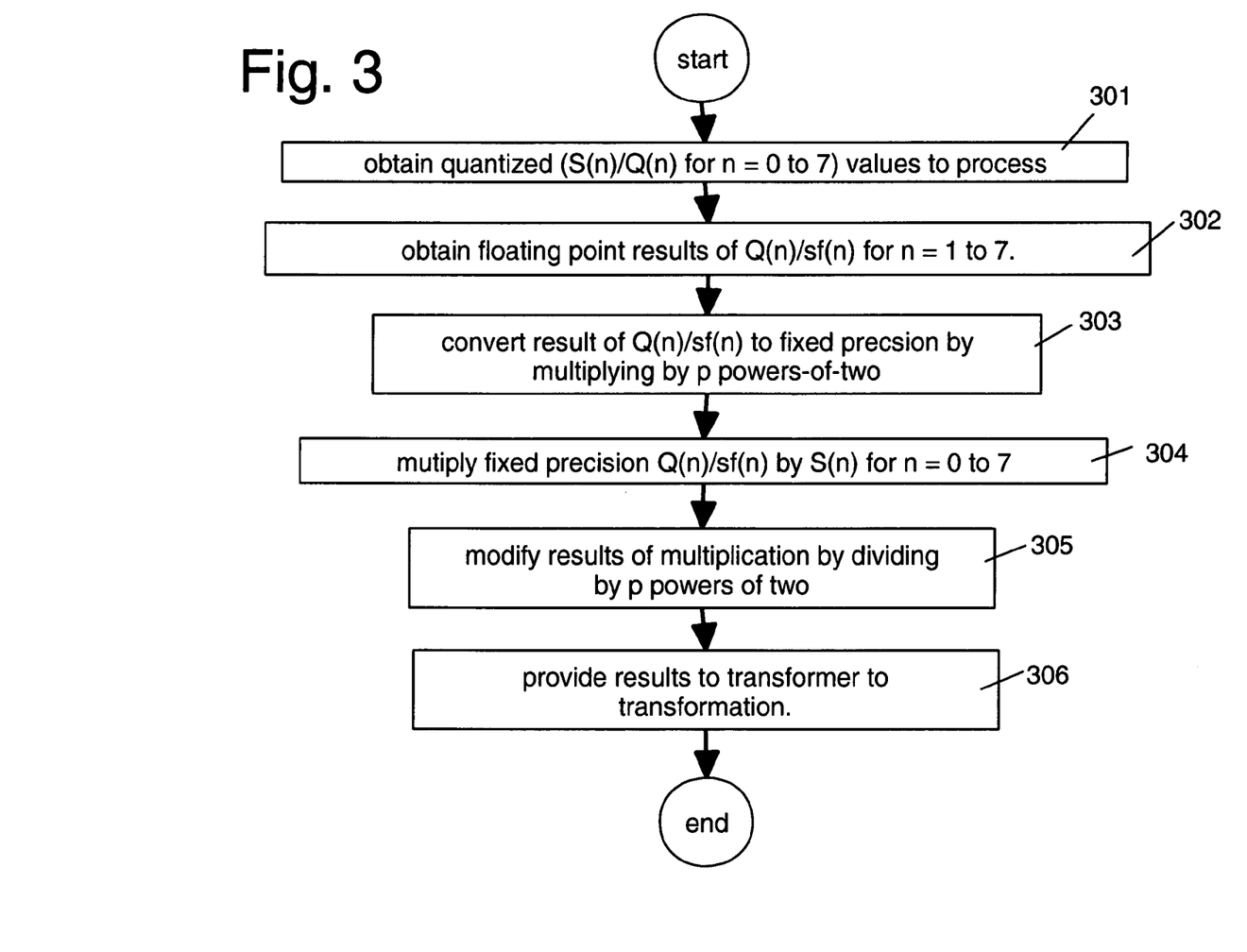
FIG. 3 is a flow chart of quantizing a transformed JPEG image according to the preferred embodiment of the present invention.

FIG. 3 is a flow chart of quantization for an IDCT according to the preferred embodiment of the present invention. At step 301 the quantized and transformed values, comprising S(n)/Q(n) for n=0 to 7, of a sample are obtained. To de-quantize, these values are multiplied by the Q(n) constants which were used to quantize them. Accordingly at step 302 results of the calculation of Q(n)/sf(n) are obtained where sf(n) includes adjustment values which compensate for the error which may be introduced by the transform to be performed. At step 303 the Q(n)/sf(n) values are converted to fixed precision and this is done by shifting the binary representations of the values p bits to the left and rounding after the decimal point to leave an integer. Then, at step 304, the multiplications of X(n) and Q(n)/sf(n), for n=1 to 7 are performed using the fixed precision Q(n)/sf(n). At step 305 the binary representations of the results of the multiplication are shifted by p bits to the right to effectively undo the left shifts at step 303. This leaves the values which comprise the S(n) values which are provided, at step 306, to the transformer transformation using the IDCT.

Note that whilst the embodiment has been described as part of a quantization or de-quantization step a skilled person will realize that the adjustment could be factored in to the results of the transform equations in a step separate from the quantization or de-quantization step.

Note that whilst the embodiment has been described in terms of a single 1-D fast DCT, a skilled person will realize that the invention could equally be applied to other 1-D fast DCTs and further 2-D fast DCTs. Similarly a skilled person will realize that the invention could also be applied to other transforms such a discrete Fourier transforms (DFT), and wavelet transforms.

Note that a skilled person in the art will realize that the methods described with reference to FIGS. 2 and 3 could be implemented in a variety of programming languages, for example, Java™, C, and C++ (Java is a registered trademark of Sun Microsystems, Inc. in the United States, other countries, or both). Further a skilled person will realize that once implemented the methods can be stored in a computer program product comprising one or more programs, in source or executable form, on a media, such as floppy disk, CD, and DVD, suitable for loading onto a data processing host and causing the data processing host to carry out the methods.

Figure 4:
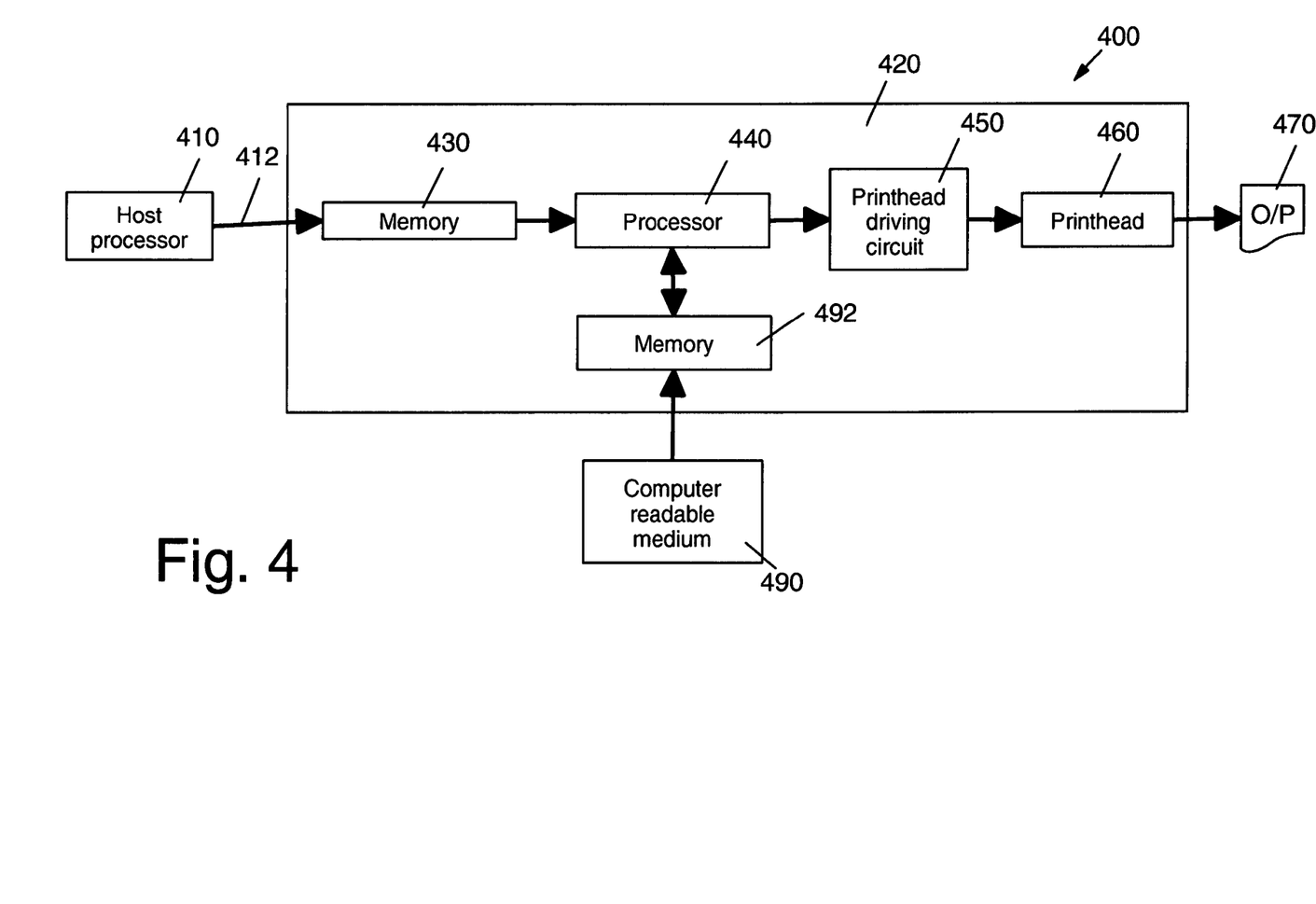
FIG. 4 is a block diagram of a printer according to the preferred embodiment of the present invention.

FIG. 4 illustrates a block diagram 400 of a printer 410 according to the present invention. In FIG. 4, the printer 420 receives image data 412 from a host processor 410. The image data 412 is provided into memory 430 where the image data may be arranged into 8×8 block samples. The 8×8 block samples are then processed by a processor 440, such as a raster image processor. The raster image processor 440 provides a compressed print stream representing the image data to a printhead driving circuit 450. The printhead driving circuit 450 then controls the printhead 460 to generate a printout 470 of the image data.

The process illustrated with reference to FIGS. 2 and 3 may be tangibly embodied in a computer-readable medium/carrier 490, e.g. one or more of the fixed and/or removable data storage devices illustrated in FIG. 4, or other data storage or data communications devices. The computer program may be loaded into the memory 492 to configure the processor 440 of FIG. 4, for execution. The computer program comprises instructions which, when read and executed by the processor 440 of FIG. 4, causes the processor 440 to perform the steps necessary to execute the steps or elements of the present invention.

Figure 5:
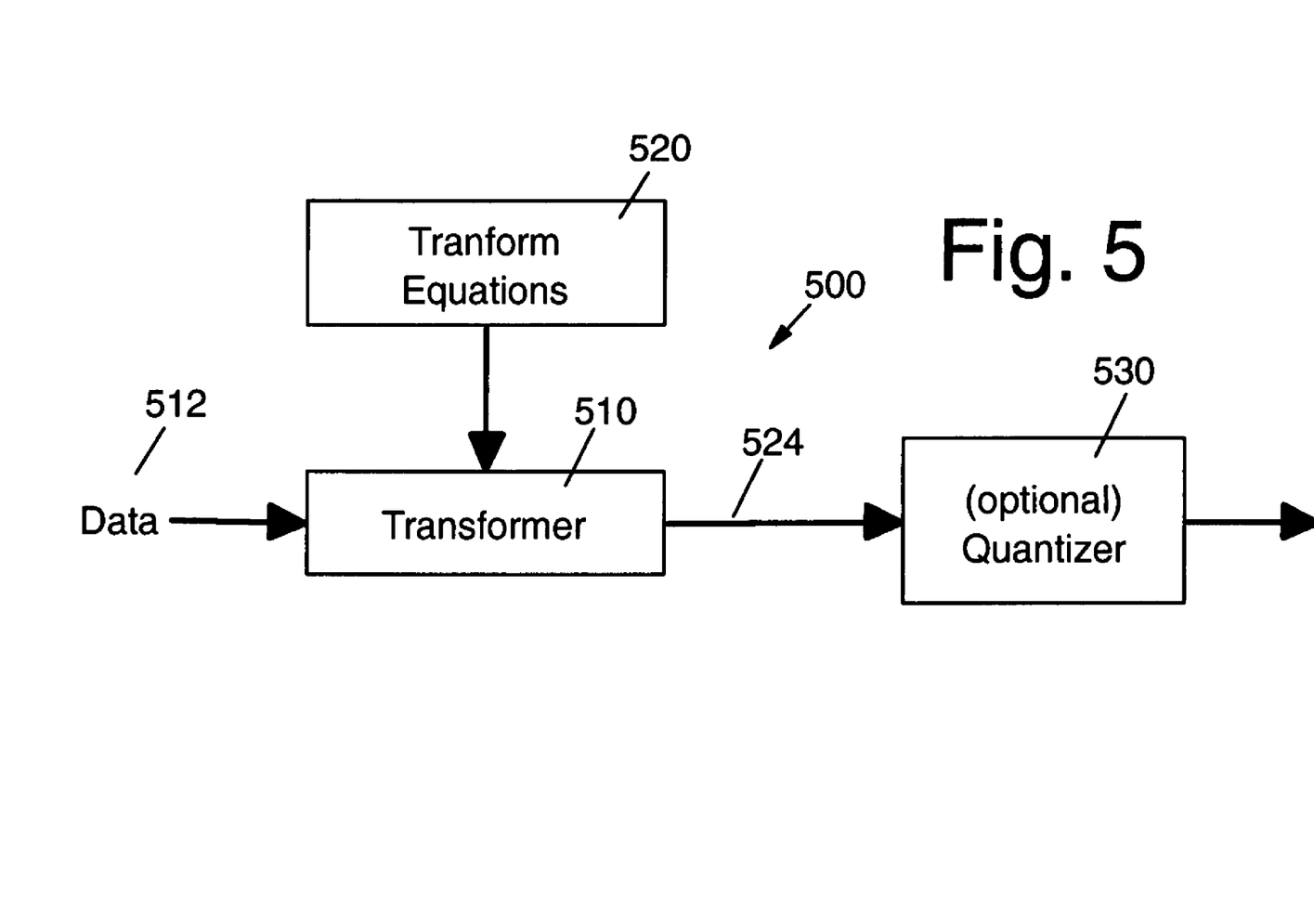
FIG. 5 is a block diagram of a data analyzing system according to the preferred embodiment of the present invention.

FIG. 5 illustrates a data analyzing system 500 according to the present invention. In FIG. 5, a transformer 510 receives a block of data 512 to be analyzed. The transformer 510 uses transform equations 520, in which constants are replace by approximations, in order to generate transformed data 524. The transformed data 524 is then quantized by quantizer 530, and as part of quantization an adjustment factor is applied to the transformed data in order to compensate for error introduced as a result of the approximations used by the transformer 510. In summary the present invention provides a method, data analyzing system, printer, and article of manufacture which reduce the error in transform equations in which constants are replaced by approximations. This is achieved by factoring an adjustment factor into the calculations which serves to reduce the error introduced by the approximations. For a forward transform equation this may be performed as part of a quantization step and for an inverse transform equation this may be performed as part of a de-quantization step. For example the adjustment factor could reduce the maximum error associated the approximations.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for reducing an error in a result of a forward transform equation, the method comprising:
calculating a first result of a forward transform equation including floating point constants;
approximating the floating point constants with integer values to generate a modified forward transform equation;
calculating a second result of the modified forward transform equation based on the integer values;
determining an adjustment factor based on the first result and the second result; and
modifying the second result using the adjustment factor to reduce the error of the modified forward transform equation.

2. The method of claim 1 wherein the adjustment factor is included as part of a scaling factor which is used to scale the result.

3. The method of claim 1 wherein the adjustment factor further reduces the error which will result from processing the results using an inverse transform equation.

4. The method of claim 1 wherein the adjustment factor reduces a maximum error associated with the transform equation.

5. A method for reducing an error in a result of an inverse transform equation, the method comprising:
receiving input data for processing, wherein the input data is quantized and transformed;
de-quantizing the input data by multiplying the input data by a quantization value;
generating floating point results from the input data based on an adjustment factor, wherein the adjustment factor reduces the error which is introduced as a result of integer approximations of floating point constants used when performing the inverse transform;
converting the floating point results to fixed precision results by multiplying by a value p and rounding the result;
multiplying the fixed precision results by the de-quantized input data to generate first intermediate values;
dividing the first intermediate values by the value p to generate second intermediate values;
generating the result of the inverse transform equation using the second intermediate values.

6. The method of claim 5 wherein the adjustment factor is included as part of a scaling factor which is used to scale the input data.

7. The method of claim 5 wherein the adjustment factor further compensates for errors resulting from creation of the input data using a forward transform equation.

8. The method of claim 5 wherein the adjustment factor reduces a maximum error associated with the inverse transform equation.

9. A data analyzing system for reducing an error in a result of a forward transform equation, the system comprising:
a first calculator for calculating a first result of a forward transform equation including floating point constants;
an approximator for approximating the floating point constants with integer values to generate a modified forward transform equation;
a second calculator for calculating a second result of the modified forward transform equation based on the integer values;
a determiner for determining an adjustment factor based on the first result and the second result; and
a modifier for modifying the second result using the adjustment factor to reduce the error of the modified forward transform equation.

10. The data analyzing system of claim 9 wherein the adjustment factor further reduces the error which will result from processing the results using an inverse transform equation.

11. The data analyzing system of claim 9 wherein the adjustment factor reduces a maximum error associated with the transform equation.

12. A data analyzing system for reducing an error in a result of an inverse transform equation, the system comprising:
a receiver for receiving input data for processing, wherein the input data is quantized and transformed;
a de-quantizer for de-quantizing the input data by multiplying the input data by a quantization value;
a first generator for generating floating point results from the input data based on an adjustment factor, wherein the adjustment factor reduces the error which is introduced as a result of integer approximations of floating point constants used when performing the inverse transform;

a converter for converting the floating point results to fixed precision results by multiplying by a value p and rounding the result;

a multiplier for multiplying the fixed precision results by the de-quantized input data to generate first intermediate values;

a divider for dividing the first intermediate values by the value p to generate second intermediate values; and a second generator for generating the result of the inverse transform equation using the second intermediate values.

13. The data analyzing system of claim 12 wherein the adjustment factor further reduces the error which resulted from creation of the input data using a forward transform equation.

14. The data analyzing system of claim 12 wherein the adjustment factor reduces a maximum error associated with the inverse transform equation.

15. Apparatus for reducing an error in a result of an inverse transform equation, the apparatus comprising:
memory for storing image data;
a processor for processing the image data to provide a compressed print stream output; and
a printhead driving circuit for controlling a printhead to generate a printout of the image data;
wherein the processor processes the image data by:
receiving input data for processing, wherein the input data is quantized and transformed;
de-quantizing the input data by multiplying the input data by a quantization value;
generating floating point results from the input data based on an adjustment factor, wherein the adjustment factor reduces the error which is introduced as a result of integer approximations of floating point constants used when performing the inverse transform;
converting the floating point results to fixed precision results by multiplying by a value p and rounding the result;
multiplying the fixed precision results by the de-quantized input data to generate first intermediate values;
dividing the first intermediate values by the value p to generate second intermediate values; and
generating the result of the inverse transform equation using the second intermediate values.

16. The apparatus of claim 15 wherein the processor includes the adjustment factor as part of a scaling factor which is used to scale the input data.

17. The apparatus of claim 15 wherein the adjustment factor further reduces the error which resulted from creation of the input data using a forward transform equation.

18. The apparatus of claim 15 wherein the adjustment factor reduces a maximum error associated with the inverse transform equation.

19. A computer readable medium tangibly embodying programmed instructions which, when executed by a computer system, perform a method for reducing an error in a result of a forward transform equation, the method comprising:

calculating a first result of a forward transform equation including floating point constants;

approximating the floating point constants with integer values to generate a modified forward transform equation;

calculating a second result of the modified forward transform equation based on the integer values;

determining an adjustment factor based on the first result and the second result; and modifying the second result using the adjustment factor to reduce the error of the modified forward transform equation.

20. The computer readable medium of claim 19 wherein the adjustment factor is included as part of a scaling factor which is used to scale the result.

21. The computer readable medium of claim 19 wherein the adjustment factor further reduces the error which will result from processing the results using an inverse transform equation.

22. The computer readable medium of claim 19 wherein the adjustment factor reduces a maximum error associated with the forward transform equation.

23. A computer readable medium tangibly embodying programmed instructions which, when executed by a computer system, perform a method for reducing an error in a result of an inverse transform equation, the method comprising:
receiving input data for processing, wherein the input data is quantized and transformed;
de-quantizing the input data by multiplying the input data by a quantization value;
generating floating point results from the input data based on an adjustment factor, wherein the adjustment factor reduces the error which is introduced as a result of integer approximations of floating point constants used when performing the inverse transform;
converting the floating point results to fixed precision results by multiplying by a value p and rounding the result;
multiplying the fixed precision results by the de-quantized input data to generate first intermediate values;
dividing the first intermediate values by the value p to generate second intermediate values; and
generating the result of the inverse transform equation using the second intermediate values.

24. The computer readable medium of claim 23 wherein the adjustment factor is included as part of a scaling factor which is used to scale the input data.

25. The computer readable medium of claim 23 wherein the adjustment factor further reduces the error which resulted from creation of the input data using a forward transform equation.

26. The computer readable medium of claim 23 wherein the adjustment factor reduces a maximum error associated with the inverse transform equation.

* * * * *